US011942256B2

(12) United States Patent
Kim et al.

(10) Patent No.: US 11,942,256 B2
(45) Date of Patent: Mar. 26, 2024

(54) COIL COMPONENT

(71) Applicant: SAMSUNG ELECTRO-MECHANICS CO., LTD., Suwon-si (KR)

(72) Inventors: Jae Hun Kim, Suwon-si (KR); Byeong Cheol Moon, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 524 days.

(21) Appl. No.: 17/097,353

(22) Filed: Nov. 13, 2020

(65) Prior Publication Data

US 2022/0068545 A1 Mar. 3, 2022

(30) Foreign Application Priority Data

Sep. 1, 2020 (KR) ........................ 10-2020-0111243

(51) Int. Cl.
*H01F 27/28* (2006.01)
*H01F 27/24* (2006.01)
(Continued)

(52) U.S. Cl.
CPC ......... *H01F 27/2804* (2013.01); *H01F 27/24* (2013.01); *H01F 27/29* (2013.01); *H01F 41/041* (2013.01); *H01F 2027/2809* (2013.01)

(58) Field of Classification Search
CPC ...... H01F 27/2804; H01F 27/24; H01F 27/29; H01F 41/041; H01F 2027/2809;
(Continued)

(56) References Cited

U.S. PATENT DOCUMENTS

2011/0292567 A1* 12/2011 McConnell ............ B23K 1/203 29/25.42
2014/0176284 A1* 6/2014 Lee ..................... H01F 17/0013 336/200

(Continued)

FOREIGN PATENT DOCUMENTS

JP 2002270428 * 9/2002
KR 10-1532171 B1 7/2015

(Continued)

OTHER PUBLICATIONS

Wurth Elektronik, We-Mapi, 2510 Wire-wound SMD Inductor with a Composite Iron Powder Core, 4.7 uH +/−20% Moulded 940mA (https://sg.rs-online.com/web/p/wire-wound-surface-mount-inductors/7922720/).

*Primary Examiner* — Bickey Dhakal
*Assistant Examiner* — Matthew T Sarles
(74) *Attorney, Agent, or Firm* — MORGAN, LEWIS & BOCKIUS LLP

(57) ABSTRACT

A coil component includes a support substrate, a body having a first surface and a second surface opposing each other and having the support substrate disposed therein, a coil portion disposed on at least one surface of the support substrate and having an end of an outermost turn disposed closer to the first surface of the body than the second surface of the body, and a lead-out portion having a first surface connected to the end of the outermost turn and a second surface opposing the first surface of the lead-out portion and exposed to the first surface of the body. An area of the first surface of the lead-out portion is greater than an area of the second surface of the lead-out portion.

30 Claims, 9 Drawing Sheets

(51) Int. Cl.
*H01F 27/29* (2006.01)
*H01F 41/04* (2006.01)

(58) Field of Classification Search
CPC .. H01F 5/04; H01F 17/0013; H01F 2017/048; H01F 17/04; H01F 27/292; H01F 27/2852; H01F 27/306; H01F 2017/002
See application file for complete search history.

(56) References Cited

U.S. PATENT DOCUMENTS

| | | | | |
|---|---|---|---|---|
| 2015/0102891 | A1* | 4/2015 | Yoon | H01F 27/2804 336/200 |
| 2015/0136463 | A1* | 5/2015 | Lee | H01G 4/232 361/301.4 |
| 2016/0172103 | A1* | 6/2016 | Jeong | H01F 17/04 29/605 |
| 2016/0351332 | A1* | 12/2016 | Lee | H01G 4/232 |
| 2018/0122546 | A1* | 5/2018 | Lee | H01F 27/24 |
| 2018/0197672 | A1* | 7/2018 | Kim | H01F 41/041 |
| 2018/0204663 | A1* | 7/2018 | Lee | H01F 17/0013 |
| 2018/0268990 | A1* | 9/2018 | Lee | H01F 27/29 |
| 2019/0013143 | A1 | 1/2019 | Kim et al. | |
| 2019/0051450 | A1* | 2/2019 | Shimoda | H01F 27/323 |
| 2019/0115134 | A1* | 4/2019 | Park | H01F 17/0013 |
| 2019/0122795 | A1* | 4/2019 | Lee | H01F 17/0013 |
| 2019/0156977 | A1* | 5/2019 | Jung | H01F 5/04 |
| 2019/0189336 | A1* | 6/2019 | Kim | H01F 27/32 |
| 2019/0259522 | A1* | 8/2019 | Kim | H01F 27/24 |
| 2019/0333684 | A1* | 10/2019 | Li | H01F 27/28 |
| 2019/0333686 | A1* | 10/2019 | Kazuta | H01F 27/29 |
| 2020/0027647 | A1* | 1/2020 | Yang | H01F 17/0013 |
| 2020/0051727 | A1* | 2/2020 | Hong | H01F 41/10 |
| 2020/0051735 | A1* | 2/2020 | Yeo | H01F 27/2804 |
| 2020/0066439 | A1* | 2/2020 | Koo | H01F 27/361 |
| 2020/0111603 | A1* | 4/2020 | Sato | H01F 27/255 |
| 2020/0168387 | A1* | 5/2020 | Kim | H01F 27/292 |
| 2020/0185143 | A1* | 6/2020 | Jung | H01F 27/29 |
| 2020/0185148 | A1* | 6/2020 | Yoon | H01F 17/0013 |
| 2020/0194167 | A1* | 6/2020 | Lee | H01F 27/292 |
| 2020/0203051 | A1* | 6/2020 | Kazuta | H01F 27/32 |
| 2020/0234873 | A1* | 7/2020 | Kato | H01F 17/0013 |
| 2020/0265986 | A1* | 8/2020 | Mizukami | H01F 17/0013 |
| 2020/0402699 | A1* | 12/2020 | Kim | H01F 17/0013 |
| 2020/0411232 | A1* | 12/2020 | Matsumoto | H01F 27/327 |
| 2021/0020354 | A1* | 1/2021 | Watanabe | H01F 27/2852 |
| 2021/0020357 | A1* | 1/2021 | Kazuta | H01F 17/0013 |
| 2021/0027934 | A1* | 1/2021 | Mizukami | H01F 27/292 |
| 2021/0043365 | A1* | 2/2021 | Ooi | H01F 41/0246 |
| 2021/0043366 | A1* | 2/2021 | Ooi | H01F 17/045 |
| 2021/0065951 | A1* | 3/2021 | Arai | H01F 5/003 |
| 2021/0183558 | A1* | 6/2021 | Park | H01F 27/255 |
| 2021/0249183 | A1* | 8/2021 | Urabe | H01F 17/0006 |

FOREIGN PATENT DOCUMENTS

| | | | |
|---|---|---|---|
| KR | 101532171 | * | 7/2015 |
| KR | 10-2015-0114924 | A | 10/2015 |
| KR | 10-1662209 | B1 | 10/2016 |
| KR | 10-2019-0004915 | A | 1/2019 |
| KR | 10-2191248 | B1 | 12/2020 |

* cited by examiner

COIL COMPONENT

CROSS-REFERENCE TO RELATED APPLICATION(S)

This application claims the benefit of priority to Korean Patent Application No. 10-2020-0111243, filed on Sep. 1, 2020 in the Korean Intellectual Property Office, the entire disclosure of which is incorporated herein by reference.

TECHNICAL FIELD

The present disclosure relates to a coil component.

BACKGROUND

Inductors, as coil components, are representative passive electronic components used in electronic devices, along with resistors and capacitors.

As electronic devices have become increasingly better in terms of performance, and smaller, electronic components used in electronic devices are increasing in number and are being miniaturized in size.

Accordingly, an inductor has been rapidly converted to a chip which is small-sized and capable of high-density automatic surface mounting. A coil is formed by plating on upper and lower surfaces of a substrate, and magnetic sheets in which magnetic powder particles and a resin are mixed are laminated on upper and lower portions of the coil, followed by being pressed and cured, so that thin-film inductors may be manufactured and developed.

However, in the case of thin-film inductors, as the chip size becomes smaller, the volume of the body decreases, and thus, the space in which the coil may be formed inside the body also decreases, and the number of turns of the formed coil decreases.

When the area in which the coil is formed is reduced as described above, it is difficult to secure high capacity, the width of the coil is reduced, DC and AC resistance increase, and a quality factor (Q) decreases.

Therefore, even when the size of the component is reduced, to implement high capacity and improved quality factor, the coil may be formed to occupy a relatively largest area inside the miniaturized body.

In addition, as thinned coil components are manufactured, there is a problem in that connection reliability and structural rigidity between a conductor and the body are deteriorated when external force or the like acts on a portion on which the coil and the external electrode are connected.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

Exemplary embodiments provide a coil component capable of implementing high capacity by increasing an area in which a coil portion is formed, while maintaining a size of the coil component.

Exemplary embodiments provide a coil component in which connection reliability and structural rigidity of a portion on which a coil portion and an external electrode are connected are enhanced.

According to an exemplary embodiment, a coil component includes a support substrate, a body having a first surface and a second surface opposing each other and having the support substrate disposed therein, a coil portion disposed on at least one surface of the support substrate and including an outermost turn having an end disposed closer to the first surface of the body than the second surface of the body, and a lead-out portion having a first surface connected to the end of the outermost turn and a second surface opposing the first surface of the lead-out portion and exposed to the first surface of the body. An area of the first surface of the lead-out portion is greater than an area of the second surface of the lead-out portion.

According to another exemplary embodiment, a coil component includes a body having a first surface and a second surface opposing each other; a support substrate disposed in an interior of the body, and including a first surface perpendicular to the first surface of the body; a first coil portion disposed on the first surface of the support substrate and including an outermost turn having an end disposed closer to the first surface of the body than the second surface of the body; and a second lead-out portion having a first surface connected to the end of the outermost turn of the second coil portion, and a second surface opposing the first surface and exposed to the first surface of the body. A line width of the first surface of the second lead-out portion is greater than a line width of the second surface of the second lead-out portion.

According to still another exemplary embodiment, a coil component includes a body having first and second surfaces opposing each other and third and fourth surfaces connecting the first surface to the second surface of the body and opposing each other in a length direction of the body; a support substrate disposed in an interior of the body; a coil portion disposed on at least one surface of the support substrate and including an outermost turn having an end disposed closer to the first surface of the body than the second surface of the body; and a lead-out portion extending from the end of the outermost turn to the first surface of the body, and including a first surface connected to the end of the outermost turn and a second surface opposing the first surface of the lead-out portion and exposed to the first surface of the body. The lead-out portion includes at least one protruding portion extending toward the third surface or the fourth surface of the body in the length direction. The at least one protruding portion shares a surface with the first surface of the lead-out portion.

To still another exemplary embodiment, a coil component includes a support substrate, a body having a first surface and a second surface opposing each other and having the support substrate disposed therein, a coil portion disposed on at least one surface of the support substrate and including an outermost turn having an end disposed closer to the first surface of the body than the second surface of the body, and a lead-out portion having a first surface connected to the end of the outermost turn and a second surface opposing the first surface of the lead-out portion and exposed to the first surface of the body. The lead-out portion includes a tapered portion in a direction from the first surface of the lead-out portion to the second surface of the lead-out portion.

BRIEF DESCRIPTION OF DRAWINGS

The above and other aspects, features, and advantages of the present inventive concept will be more clearly understood from the following detailed description, taken in conjunction with the accompanying drawings, in which.

DETAILED DESCRIPTION

Figure 1:
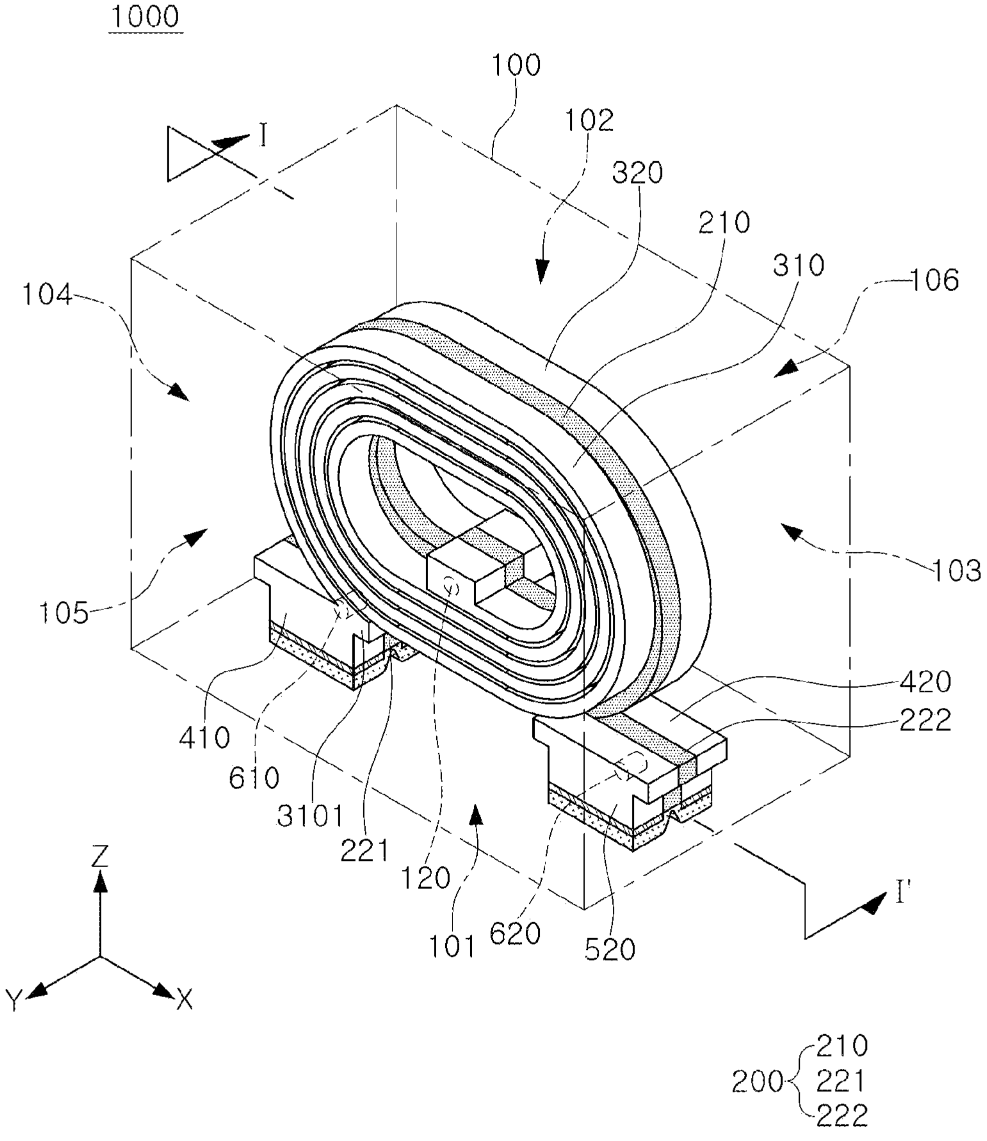
FIG. 1 is a view schematically illustrating a coil component according to a first embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly. Throughout the specification, the term "on" means to be positioned above or below the target portion, and does not necessarily mean to be positioned above the direction of gravity.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after gaining an understanding of the disclosure of this application. Further, although the examples described herein have a variety of configurations, other configurations are possible as will be apparent after an understanding of the disclosure of this application.

The drawings may not be to scale, and the relative sizes, proportions, and depiction of elements in the drawings may be exaggerated for clarity, illustration, and convenience.

Since the sizes and thicknesses of respective components illustrated in the drawings are arbitrarily illustrated for convenience of description, the present disclosure is not necessarily limited to the illustration of the drawings.

In the drawings, the X direction may be defined as a first direction or a length direction, the Y direction may be defined as a second direction or a width direction, and the Z direction may be defined as a third direction or a thickness direction.

Hereinafter, a coil component according to an embodiment will be described in detail with reference to the accompanying drawings, and in the description with reference to the accompanying drawings, the same or corresponding components are assigned the same reference numbers and overlapped descriptions thereof are omitted.

Various types of electronic components are used in electronic devices, and various types of coil components may be appropriately used between the electronic components, to remove noise or the like.

For example, coil components in electronic devices may be used as power inductors, high frequency inductors (HF inductors), general beads, high frequency beads (GHz beads), common mode filters, or the like.

First Embodiment

Figure 2:
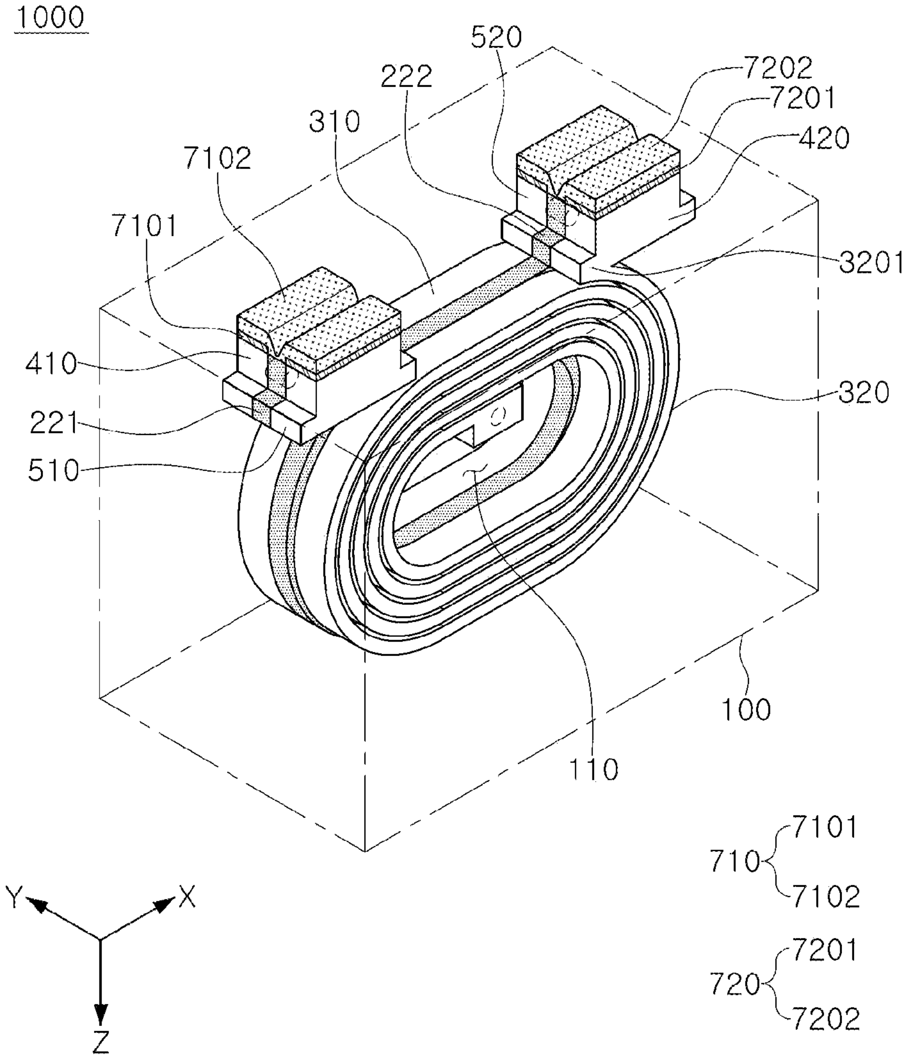
FIG. 2 is a view of the coil component of FIG. 1 as viewed from below.
Figure 3:
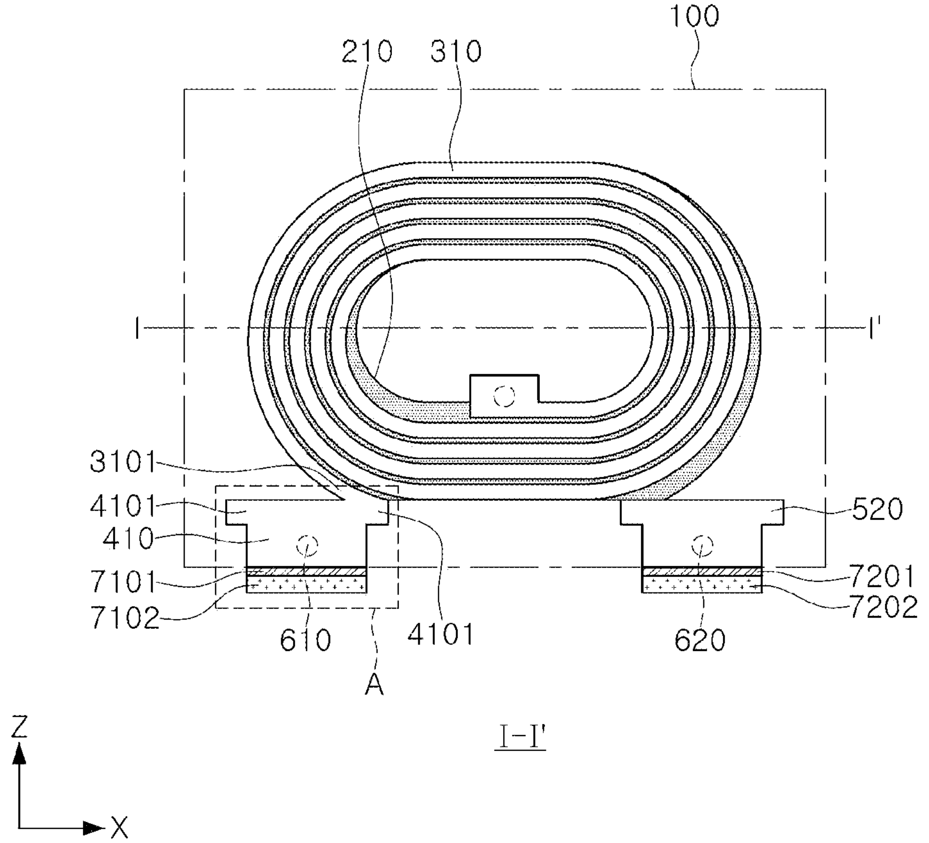
FIG. 3 is a cross-sectional view taken along line I-I' of FIG. 1.
Figure 4:
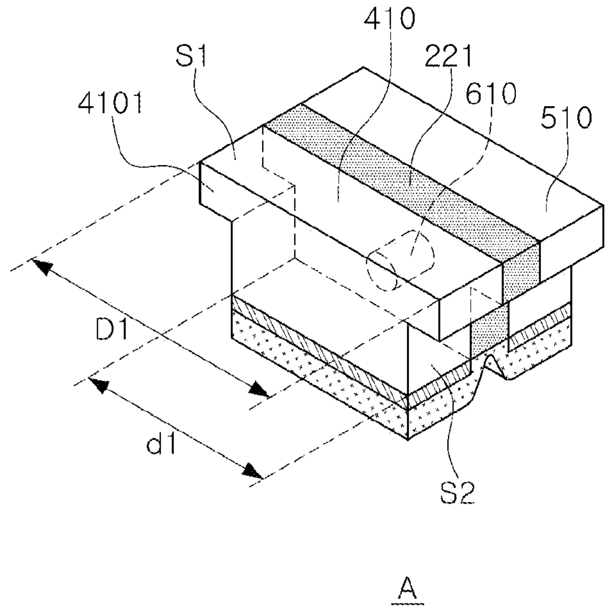
FIG. 4 is an enlarged view of portion A in FIG. 3.

FIG. 1 is a view schematically illustrating a coil component according to a first embodiment. FIG. 2 is a view of the coil component of FIG. 1, viewed from below. FIG. 3 is a cross-sectional view taken along line I-I' of FIG. 1. FIG. 4 is an enlarged view of portion A of FIG. 3.

Referring to FIGS. 1 and 2, a coil component 1000 according to the first embodiment includes a body 100, a support substrate 200, first and second coil portions 310 and 320, and first and second lead-out portions 410 and 420, and may further include first and second auxiliary lead-out portions 510 and 520, first and second connection vias 610 and 620, and first and second external electrodes 710 and 720.

The support substrate 200 is disposed inside the body 100 to be described later, and supports the first and second coil portions 310 and 320 and the first and second lead-out portions 410 and 420.

The support substrate 200 may be formed of an insulating material including a thermosetting insulating resin such as an epoxy resin, a thermoplastic insulating resin such as polyimide, or a photoimageable dielectric resin, or may be formed of an insulating material impregnated with a reinforcing material such as glass fiber or inorganic filler. As an example, the support substrate 200 may be formed of an insulating material such as Prepreg, Ajinomoto Build-up Film (ABF), FR-4, Bismaleimide Triazine (BT) film, Photo Imageable Dielectric (PID) film, or the like, but the material is not limited thereto.

As the inorganic filler, at least one or more selected from the group consisting of silica ($SiO_2$), alumina ($Al_2O_3$), silicon carbide (SiC), barium sulfate ($BaSO_4$), talc, mud, mica powder, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$) and calcium zirconate ($CaZrO_3$) may be used.

When the support substrate 200 is formed of an insulating material including a reinforcing material, the support substrate 200 may provide more excellent rigidity. When the support substrate 200 is formed of an insulating material that does not contain glass fibers, the support substrate 200 may be advantageous in reducing the overall thickness of the first and second coil portions 310 and 320.

The central portion of the support substrate 200 may be penetrated to form a through-hole (not illustrated), and the through-hole (not illustrated) may be filled with a magnetic material of the body 100 to be described later to form a core portion 110. In this manner, the performance of the inductor may be improved by forming the core portion 110 filled with the magnetic material.

The support portion 210 is a region of the support substrate 200, which is disposed between the first and second coil portions 310 and 320 to be described later, to support the first and second coil portions 310 and 320.

First and second end portions 221 and 222 extend from the support portion 210 and support the first and second lead-out portions 410 and 420 and first and second auxiliary lead-out portions 510 and 520 to be described later, in the support substrate 200. Specifically, the first end portion 221 is disposed between the first lead-out portion 410 and the first auxiliary lead-out portion 510 to support the first lead-out portion 410 and the first auxiliary lead-out portion 510. The second end portion 222 is disposed between the second lead-out portion 420 and the second auxiliary lead-out portion 520 to support the second lead-out portion 420 and the second auxiliary lead-out portion 520.

The first and second end portions 221 and 222 are exposed on the first surface 101 of the body 100 to be spaced apart from each other.

The first and second coil portions 310 and 320 are disposed on at least one surface of the support substrate 200 and express the characteristics of the coil component. For example, when the coil component 1000 of the present embodiment is used as a power inductor, the first and second coil portions 310 and 320 may serve to store electrical fields as magnetic fields and maintain the output voltage to stabilize the power of electronic devices.

Referring to FIGS. 1 and 2, the first and second coil portions 310 and 320 are disposed on two surfaces of the support substrate 200 opposing each other, respectively. The first coil portion 310 may be disposed on a first surface of the support substrate 200, to face the second coil portion 320 disposed on a second surface of the support substrate 200. The first and second coil portions 310 and 320 may be electrically connected to each other through a via electrode 120 penetrating through the support substrate 200. Each of the first coil portion 310 and the second coil portion 320 may have a planar spiral shape in which at least one turn is formed around the core portion 110. For example, the first coil portion 310 may form at least one turn about the core portion 110 on the first surface of the support substrate 200.

According to an embodiment, the first and second coil portions 310 and 320 may be formed to be upright with respect to the first surface 101 or the second surface 102 of the body 100.

Being formed to be upright with respect to the first surface 101 or the second surface 102 of the body 100 means that a surface of the first and second coil portions 310 and 320 in contact with the support substrate 200 is formed to be vertical or almost vertical with respect to the first surface 101 or the second surface 102 of the body 100. For example, the first and second coil portions 310 and 320 and the first surface 101 or the second surface 102 of the body 100 may be formed upright at 80° to 100°.

On the other hand, the first and second coil portions 310 and 320 may be formed to be parallel to the fifth surface 105 and the sixth surface 106 of the body 100. For example, the surface of the first and second coil portions 310 and 320 in contact with the support substrate 200 may be parallel to the fifth surface 105 and the sixth surface 106 of the body 100.

As the coil component 1000 is downsized to a size of 1608 or 1006 or less, the body 100 having a thickness greater than a width is formed, and the cross-sectional area of the cross section in the X-Z direction of the body 100 becomes larger than the cross-sectional area in the X-Y direction. Therefore, as the first and second coil portions 310 and 320 are formed upright with respect to the first surface 101 or the second surface 102 of the body 100, the area in which the first and second coil portions 310 and 320 may be formed increases. As the area in which the first and second coil portions 310 and 320 are formed increases, the inductance L and the quality factor Q may be improved.

Referring to FIG. 3, the first and second coil portions 310 and 320 have a constant line width up to ends 3101 and 3201 of outermost turns, respectively. The ends 3101 and 3201 of the outermost turns of the first and second coil portions, respectively, are disposed in the lower side of the body 100 based on the center of the body 100 in the thickness direction Z. For example, based on the center line I-I' penetrating through the central portion of the body 100 in the thickness direction Z, each of the ends 3101 and 3201 of the outermost turns is disposed in the lower portion of the body 100, so that the number of the outermost turns of the first and second coil portions 310 and 320 is increased, as compared to the case in which the ends 3101 and 3201 are located on the center line I-I'. For example, since the numbers of turns of the first coil portion 310 and the second coil portion 320 are each increased by a ¼ turn based on the support substrate 200, the areas occupied by the coil portions 310 and 320 may be increased.

The body 100 forms the exterior of the coil component 1000 according to the present embodiment, and includes the support substrate 200 and the first and second coil portions 310 and 320 embedded therein.

The body 100 may be formed in the shape of a hexahedron as a whole.

The body 100 includes a first surface 101 and a second surface 102 opposing each other in the thickness direction Z, and a third surface 103 and a fourth surface 104 opposing each other in the length direction X, and a fifth surface 105 and a sixth surface 106 opposing each other in the width direction Y, based on FIG. 1. Hereinafter, one surface and the other surface of the body 100 may refer to the first surface 101 and the second surface 102 of the body 100, respectively, and one side and the other side of the body 100 may refer to the third surface 103 and the fourth surface 104 of the body 100, respectively. In addition, one end surface and the other end surface of the body 100 may refer to the fifth surface 105 and the sixth surface 106 of the body 100, respectively.

The body 100 may be for example formed in such a manner that the coil component 1000 of the present embodiment in which the first and second external electrodes 710 and 720 to be described later are formed has a length of 1.0 mm, a width of 0.5 mm, and a thickness of 0.8 mm, but the configuration is not limited thereto. On the other hand, since the above-described numerical values are merely design values that do not reflect process errors, etc., it should be considered to be within the scope of the present disclosure to the extent that may be recognized as a process error.

The body 100 may include a magnetic material and an insulating resin. Specifically, the body 100 may be formed by laminating one or more magnetic sheets including an insulating resin and a magnetic material dispersed in the insulating resin. The body 100 may also have a structure different from the structure in which a magnetic material is dispersed in an insulating resin. For example, the body 100 may also be formed of a magnetic material such as ferrite.

The magnetic material may be ferrite or magnetic metal powder. Ferrite powder particles may be at least one or more of, for example, spinel type ferrites such as Mg—Zn-based, Mn—Zn-based, Mn—Mg-based, Cu—Zn-based, Mg—Mn—Sr-based and Ni—Zn-based ferrites, hexagonal ferrites such as Ba—Zn-based, Ba—Mg-based, Ba—Ni-based, Ba—Co-based and Ba—Ni—Co-based ferrites, garnet type ferrites such as Y series, and Li ferrites. In addition, the magnetic metal powder included in the body 100 may include at least one of iron (Fe), silicon (Si), chromium (Cr), cobalt (Co), molybdenum (Mo), aluminum (Al), niobium (Nb), copper (Cu), nickel (Ni) and alloys thereof. For example, the magnetic metal powder may be at least one or more of pure iron powder, Fe—Si alloy powder, Fe—Si—Al alloy powder, Fe—Ni alloy powder, Fe—Ni—Mo alloy powder, Fe—Ni—Mo—Cu alloy powder, Fe—Co alloy powder, Fe—Ni—Co alloy powder, Fe—Cr alloy powder, Fe—Cr—Si alloy powder, Fe—Si—Cu—Nb alloy powder, Fe—Ni—Cr alloy powder, and Fe—Cr—Al alloy powder. In this case, the magnetic metal powder may be amorphous or crystalline. For example, the magnetic metal powder may be a Fe—Si—B—Cr-based amorphous alloy powder, but is not limited thereto. Ferrite and magnetic metal powder may each have an average diameter of about 0.1 μm to 30 μm, but are not limited thereto.

The body 100 may include two or more types of magnetic materials dispersed in an insulating resin. In this case, that the magnetic materials are of different types means that the magnetic materials dispersed in the insulating resin are distinguished from each other by any one of an average diameter, composition, crystallinity, and shape. The insulating resin may include, but is not limited to, epoxy, polyimide, liquid crystal polymer, or the like alone or as a mixture.

The first and second lead-out portions 410 and 420 are connected to the ends 3101 and 3201 of the outermost turns of the first and second coil portions, respectively, and are exposed to the first surface 101 of the body 100, to be spaced apart from each other. However, the first and second lead-out portions 410 and 420 are spaced apart from the third and fourth surfaces 103 and 104 of the body 100.

Referring to FIGS. 1 and 2, the end 3101 of the outermost turn of the first coil portion formed on the first surface of the support substrate 200 is extended to form the first lead-out portion 410, and the first lead-out portion 410 is exposed to the first surface 101 of the body 100. The end 3201 of the outermost turn of the second coil portion 320 is extended to the second surface of the support substrate 200 opposing the first surface of the support substrate 200 to form a second lead-out portion 420, and the second lead-out portion 420 is exposed to the first surface 101 of the body 100 to be spaced apart from the first lead-out portion 410.

Referring to FIGS. 1 and 2, the first and second external electrodes 710 and 720 and the first and second coil portions 310 and 320 are connected through the first and second lead-out-portions 410 and 420 disposed in the body 100.

Referring to FIGS. 3 and 4, the first and second lead-out portions 410 and 420 have upper surfaces connected to the ends 3101 and 3201 of the outermost turns of the first and second coil portions, respectively, and lower surfaces opposing the upper surfaces and exposed to the first surfaces 101 of the body 100, respectively. Referring to FIG. 4, an area S1 of the upper surface of each of the first and second lead-out portions 410 and 420 is larger than an area S2 of the lower surface of each of the first and second lead-out portions 410 and 420. Further, a line width D1 of the upper surface of each of the first and second lead-out portions 410 and 420 is greater than a line width dl of the lower surface of each of the first and second lead-out portions 410 and 420.

In one embodiment, respective angles between the upper surfaces of the first and second lead-out portions 410 and 420 and outer circumferential surfaces of the outermost turns of the first and second coil portions 310 and 320 may range between 0 degree and 90 degree.

The first lead-out portion 410 includes an anchor portion 4101 connected to the end 3101 of the outermost turn of the first coil portion and inserted into the body 100. On the other hand, although not specifically illustrated, an anchor portion connected to the end 3201 of the outermost turn of the second coil portion and inserted into the body 100 may be included. In this embodiment, the description of the first lead-out portion 410 is also applied to the second lead-out portion 420 unless there are special circumstances, and the description of the anchor portion of the first lead-out portion 410 may also be applied to the anchor portion of the second lead-out portion.

On the other hand, the first and second lead-out portions 410 and 420 may include the anchor portions 4101 connected to the upper surfaces of the first and second lead-out portions 410 and 420 and protruding toward the third and fourth surfaces 103 and 104 of the body 100, respectively. The protruding portions of the first and second lead-out portions 410 and 420 may share the upper surfaces of the first and second lead-out portions 410 and 420, respectively.

In one embodiment, each of the first and second lead-out portions 410 and 420 may include a tapered portion in a direction from the upper surfaces to the lower surfaces of the first and second lead-out portions 410 and 420.

In the case of a related art coil component, in which an end of an outermost turn is disposed closer to a lower side of a body, since a line width of the end of the outermost turn is smaller than a line width of a lead portion, there is a problem in that the reliability of a connection portion between the coil portion and the external electrode is deteriorated. However, in this embodiment of the present disclosure, as the line widths of the lead-out portions 410 and 420 connected to the ends 3101 and 3201 of the outermost turns are wider than the line widths of the lead-out portions 410 and 420 exposed on the lower surface of the body 100, the aforementioned deterioration of connection reliability may be prevented. For example, in a case in which external force acts on portions of the first and second lead-out portions 410 and 420 through the anchor portions 4101 of the lead-out portions 410 and 420 inserted into the body 100, connection reliability between the lead-out portions 410 and 420 and the body 100 may be improved.

The first and second auxiliary lead-out portions 510 and 520 are disposed on both surfaces of the support substrate 200 to correspond to the first and second lead-out portions 410 and 420. Specifically, the first auxiliary lead-out portion 510 is disposed to correspond to the first lead-out portion 410 on the second surface of the first end portion 221 of the support substrate 200, and is spaced apart from the second coil portion 320. The second auxiliary lead-out portion 520 is disposed to correspond to the second lead-out portion 420 on the first surface of the second end portion 222 of the support substrate 200, and is spaced apart from the first coil portion 310. The first and second auxiliary lead-out portions 510 and 520 are disposed to be spaced apart from each other on the first surface 101 of the body 100.

The first and second auxiliary lead-out portions 510 and 520 are electrically connected to the first and second lead-out portions 410 and 420 by the first and second connection vias 610 and 620 to be described later, and may be directly connected to the first and second external electrodes 710 and 720. Since the first and second auxiliary lead-out portions 510 and 520 are directly connected to the first and second external electrodes 710 and 720, the adhesive strength between the first and second external electrodes 710 and 720 and the body 100 may be improved. The body 100 includes an insulating resin and a metallic magnetic material, and the first and second external electrodes 710 and 720 include a conductive metal, so that they are formed of different materials, and thus, there is a strong tendency not to be mixed with each other. Therefore, by forming the first and second auxiliary lead-out portions 510 and 520 inside the body 100 to be exposed to the outside of the body 100, the first and second external electrodes 710 and 720 and the first and second auxiliary lead-out portions 510 and 520 may be additionally connected. The connection between the first and second auxiliary lead-out portions 510 and 520 and the first and second external electrodes 710 and 720 is a connection between metal and metal, to have bonding force stronger than the bonding between the body 100 and the first and second external electrodes 710, thereby resulting in improving the bonding force between the external electrodes 710 and 720 and the external electrodes 710 and 720 to the body 100.

On the other hand, although not specifically illustrated, the coil component of the present embodiment may further include anchor portions formed on the first and second auxiliary lead-out portions 510 and 520. In the present embodiment, unless there are special circumstances, the description of the anchor portion of the first auxiliary lead-out portion 510 may be similarly applied to the anchor portion of the second auxiliary lead-out portion 520.

In this embodiment, as the line width of the auxiliary lead-out portions 510, 520 adjacent to the ends 3101 and 3201 of the outermost turns is greater than the line width of the auxiliary lead-out portions 510 and 520 exposed on the lower surface of the body 100, connection reliability between the body 100 and the external electrodes 710 and 720 may be further improved. For example, when external force acts on portions of the auxiliary lead-out portions 510 and 520 through the anchor portions of the auxiliary lead-out portions 510 and 520 inserted into the body 100, connection reliability between the auxiliary lead-out portions 510 and 520 and the body 100 may be improved.

The first coil portion 310, the first lead-out portion 410, the first auxiliary lead-out portion 510, and the via electrode 120 are integrally formed so that a boundary may not be formed therebetween, which is only exemplary. Therefore, the case in which the above-described components are formed at different stages to form a boundary therebetween is not excluded from the scope of the present disclosure. In this embodiment, for convenience of descriptions, the first coil portion 310, the first lead-out portion 410, and the first auxiliary lead-out portion 510 are described, but the same descriptions may also be applied to the second coil portion 320, the second lead-out portion 420, and the second auxiliary lead-out portion 520.

At least one of the first coil portion 310, the first lead-out portion 410, the first auxiliary lead-out portion 510, and the via electrode 120 may include at least one conductive layer.

For example, when the first coil portion 310, the first lead-out portion 410, the first auxiliary lead-out portion 510, and the via electrode 120 are formed by plating on the first surface of the support substrate 200, each of the first coil portion 310, the first lead-out portion 410, the first auxiliary lead-out portion 510, and the via electrode 120 may include a seed layer and a plating layer. The seed layer may be formed by a vapor deposition method such as an electroless plating method or sputtering. The seed layer is formed entirely along the shape of the first coil portion 310. The thickness of the seed layer is not particularly limited, but may be formed to be thinner than the plating layer. Next, a plating layer may be disposed on the seed layer. As a non-limiting example, the plating layer may be formed using electroplating. Each of the seed layer and the plating layer may have a single layer structure or a multilayer structure. The multilayer plating layer may be formed in a conformal film structure in which one plating layer is covered by the other plating layer, or may be formed in a form in which the other plating layer is laminated on only one surface of any one plating layer.

The first coil portion 310, the first lead-out portion 410, the first auxiliary lead-out portion 510, and the seed layer of the via electrode 120 are integrally formed so that a boundary may not be formed therebetween, but the configuration is limited thereto.

The seed layer and the plating layer of the first coil portion 310, the first lead-out-portion 410, the first auxiliary lead-out-portion 510, and the via electrode 120 may be formed of a conductive material such as copper (Cu), aluminum (Al), silver (Ag), tin (Sn), gold (Au), nickel (Ni), lead (Pb), titanium (Ti), molybdenum (Mo), or alloys thereof, but the material thereof is not limited thereto.

The first and second connection vias 610 and 620 connect the first and second lead-out portions 410 and 420 to the first and second auxiliary lead-out portions 510 and 520. The first auxiliary lead-out portion 510 and the first lead-out portion 410 are connected to each other by the first connection via 610 penetrating through the first end portion 221. The second auxiliary lead-out portion 520 and the second lead-out portion 420 are connected to each other by the second connection via 620 penetrating through the second end portion 222.

Specifically, referring to FIG. 3, the first connection via 610 penetrates through the first lead-out portion 410 and the first auxiliary lead-out portion 510, to be disposed inside the body 100, and the second connection via 620 penetrates through the second lead-out portion 420 and the second auxiliary lead-out portion 520, to be disposed inside the body 100. As a result, cross-sections of the first and second connection vias 610 and 620 disposed inside the body 100 have a circular shape based on the width direction Y of the body 100. On the other hand, the present embodiment illustrates the case in which only one connection via 610, 620 is present in the lead-out portions 410 and 420, respectively, but the number of connection vias 610 and 620 is not limited thereto, and for example, may be plural. The first and second connection vias 610 and 620 can be disposed to be spaced apart from the first surface 101 of the body 100. On the other hand, the first and second connection vias 610 and 620 can be exposed to the first surface 101 of the body 100 and covered by the first and second external electrodes 710 and 720 to be described later, respectively.

The first and second external electrodes 710 and 720 are disposed to be spaced apart from each other on the first surface 101 of the body 100, and cover the first and second lead-out portions 410 and 420, respectively. The first external electrode 710 connectively contacts the first lead-out portion 410 and the first auxiliary lead-out portion 510, and the second external electrode 720 connectively contacts the second lead-out portion 420 and the second auxiliary lead-out portion 520.

When the coil component 1000 according to the present embodiment is mounted on a printed circuit board, the first and second external electrodes 710 and 720 electrically connect the coil component 1000 to the printed circuit board or the like. As an example, the coil component 1000 according to the present embodiment may be mounted so that the first surface 101 of the body 100 faces the upper surface of the printed circuit board, and in this case, since the first and second external electrodes 710 and 720 are spaced apart from each other on the first surface 101 of the body 100, the connection portion of the printed circuit board may be electrically connected.

The first and second external electrodes 710 and 720 may include at least one of a conductive resin layer and an electroplating layer. The conductive resin layer may be formed, by printing a conductive paste on the surface of the body 100 to then be cured. The conductive paste may include any one or more conductive metal selected from the group consisting of copper (Cu), nickel (Ni), and silver (Ag), and a thermosetting resin. The electroplating layer may include at least one selected from the group consisting of nickel (Ni), copper (Cu), and tin (Sn). In this embodiment, the first and second external electrodes 710 and 720 may include first layers 7101 and 7201 formed on the surface of the body 100 and in direct contact with the first and second lead-out portions 410 and 420 and the first and second auxiliary lead-out portions 510 and 520, and second layers 7102 and 7202 disposed on the first layers 7101 and 7201, respectively. For example, the first layers 7101 and 7201 may be nickel (Ni) plating layers, and the second layers 7102 and 7202 may be tin (Sn) plating layers, but are not limited thereto.

Referring to FIGS. 1 and 2, the first layers 7101 and 7102 are not disposed on the first and second end portions 221 and 222 exposed on the outer surface of the body 100. For example, a spaced portion may be formed in a central portion between the first layers 7101 and 7102 and the first and second end portions 221 and 222. Since electrical connection characteristics between the first and second end portions 221 and 222 and the first and second lead-out portions 410 and 420 are different from each other, the first and second layers 7101 and 7201 formed of metal are is mainly plated on the surfaces of the first and second lead-out portions 410 and 420 and the first and second auxiliary lead-out portions 510 and 520. As a result, in the first layers 7101 and 7201 disposed on the first and second lead-out portions 410 and 420 and the first and second auxiliary lead-out portions 510 and 520 are the first and second end portions 221, a spaced portion is formed in a region thereof corresponding to the first and second ends 221 and 222.

On the other hand, the second layers 7102 and 7202 may be disposed along the first layers 7101 and 7201 to cover the first layers 7101 and 7201 and the first and second end portions 221 and 222. Since the second layers 7102 and 7202 also do not have strong bonding strength with the first and second end portions 221 and 222, a concave portion may be formed in the central portion of the second layers 7102 and 7202.

Although not specifically illustrated, the coil component of this embodiment may further include an insulating film (not illustrated) formed between the coil portions 310 and 320 and the lead-out portions 410 and 420 and between the lead-out portions 410 and 420 and the body 100, respectively. In this embodiment, since the body 100 includes magnetic metal powder particles, the insulating film (not illustrated) is disposed between the support substrate 200 and the coil portions 310 and 320, and the lead-out portions 410 and 420 and the body 100, to insulate the coil portions 310 and 320 and the lead-out portions 410 and 420. As an example, the insulating film (not illustrated) may be formed of a thin parylene layer, but the material is not limited thereto. For example, the insulating film (not illustrated) may be formed by a spray coating method including a resin.

First Modified Example of First Embodiment

Figure 5:
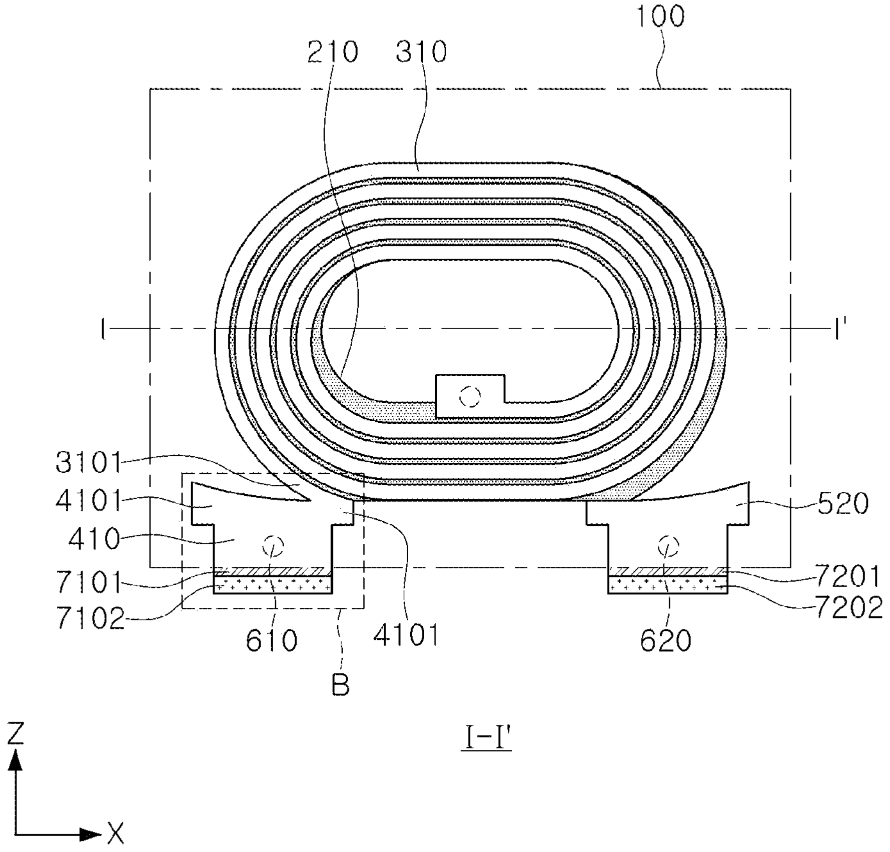
FIG. 5 is a view illustrating a first modified example of the first embodiment, and a view corresponding to FIG. 3.
Figure 6:
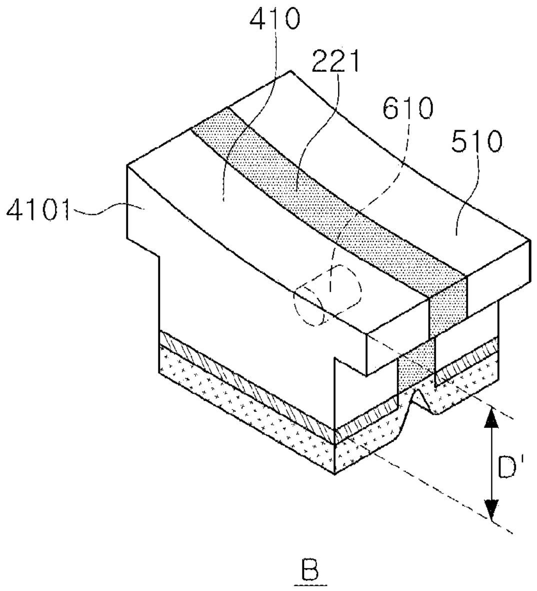
FIG. 6 is an enlarged view of portion B of FIG. 5.

FIG. 5 is a diagram illustrating a first modified example of the first embodiment, and is a view corresponding to FIG. 3. FIG. 6 is an enlarged view of portion B in FIG. 5.

A coil component 1000 according to the present modified example has a different shape of the lead-out portion compared to the coil component 1000 according to the first embodiment. Therefore, in describing the present modified example, only the shape of the lead-out portion different from that of the first embodiment will be described. For the rest of the configuration of this modification, the description in the first embodiment may be applied as it is.

Referring to FIG. 5, the upper surface of the first and second lead-out portions 410 and 420 has a curved shape. The first and second lead-out portions 410 and 420 include anchor portions 4101 connected to the upper surfaces of the first and second lead-out portions 410 and 420 and protruding toward the second surface 102 of the body 100, respectively. As a result, compared to the case in which the anchor portion includes corners of a polygonal shape, since the stress concentration in the corner region may be reduced, the connection reliability between the body 100 and the external electrodes 710 and 720 may be further improved.

Referring to FIGS. 5 and 6, a distance D' from the upper surfaces of the first and second lead-out portions 410 and 420 to the lower surfaces of the first and second lead-out portions 410 and 420 increase toward the third and fourth surfaces 103 and 104 of the body 100, respectively. In this modified example, the area of the lead-out portion connected to the outermost turn may be secured in the entire component through the curved shape of the lead-out portion, and thus, the connection reliability between the body 100 and the external electrodes 710 and 720 may be further improved.

Second Modified Example of First Embodiment

Figure 7:
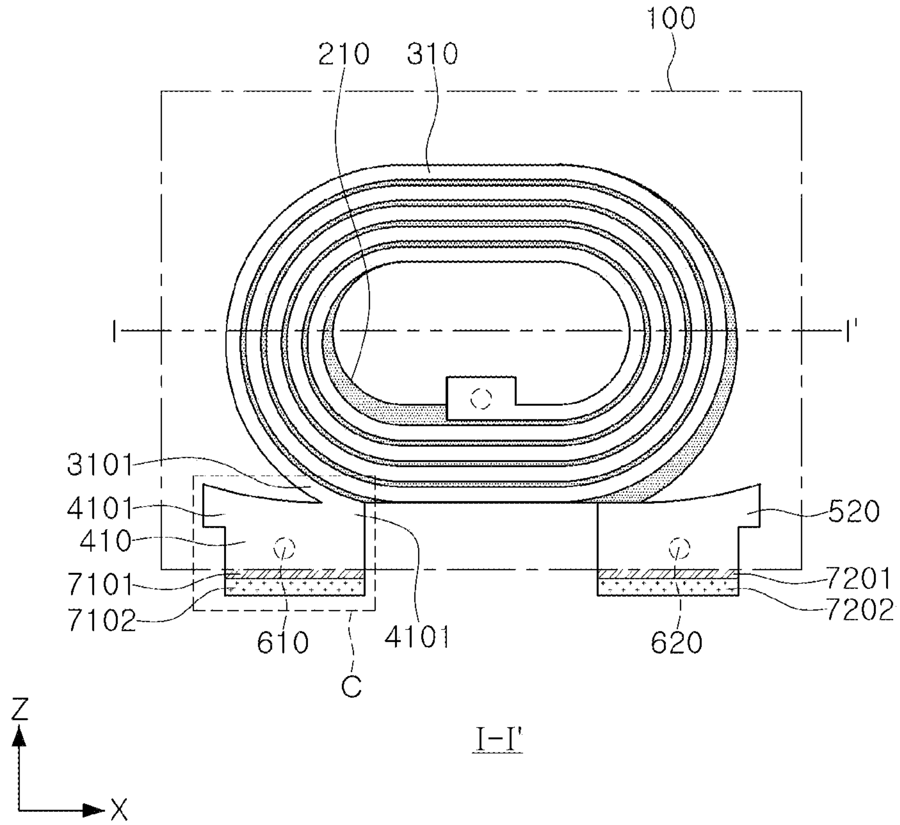
FIG. 7 is a view illustrating a second modified example of the first embodiment, and a view corresponding to FIG. 3.
Figure 8:
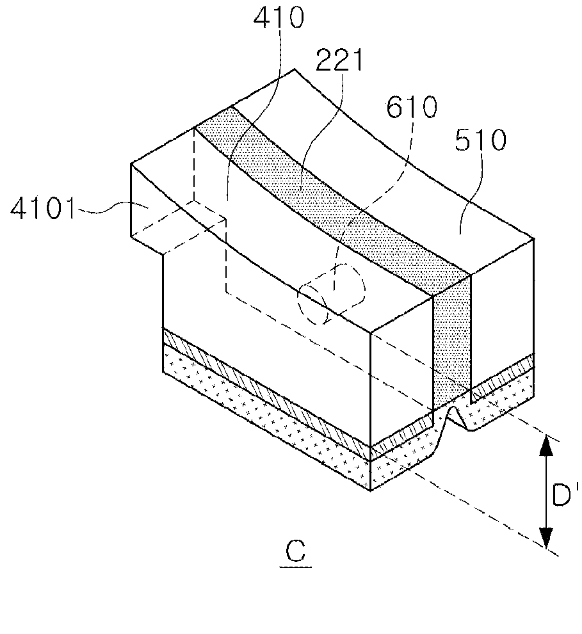
FIG. 8 is an enlarged view of portion C of FIG. 7.

FIG. 7 is a diagram illustrating a second modified example of the first embodiment, and is a view corresponding to FIG. 3. FIG. 8 is an enlarged view of portion C of FIG. 7.

A coil component 1000 according to the present modified example has a different shape of the lead-out portion compared to the coil component 1000 according to the first embodiment. Therefore, in describing the present modified example, only the shape of the lead-out portion different from that of the first embodiment will be described. For the rest of the configuration of this modification, the description in the first embodiment may be applied as it is.

Referring to FIG. 7, the first and second lead-out portions 410 and 420 may include anchor portions 4101 connected to the upper surfaces of the first and second lead-out portions 410 and 420 and protruding toward the third and fourth surfaces 103 and 104 of the body 100, respectively. Inner side surfaces of the first and second lead-out portions 410 and 420 in the X direction are substantially flat without having a protruding portion. The anchor portions 4101 serve to reinforce the bonding force between the first and second lead-out portions 410 and 420 and the body 100. For example, in this modified example, an area occupied by the body in the entirety of the component may be significantly secured, and in a case in which external force acts on the first and second lead-out portions 410 and 420, the reliability of connection between the first and second lead-out portions 410 and 420 and the body 100 may be improved.

Referring to FIG. 7, the upper surfaces of the first and second lead-out portions 410 and 420 have a curved shape. The first and second lead-out portions 410 and 420 include anchor portions 4101 connected to the upper surfaces of the first and second lead-out portions 410 and 420 and protruding toward the second surface 102 of the body 100, respectively. As a result, compared to a case in which the anchor portion includes a polygonal corner, since the stress concentration in the corner region may be reduced, the connection reliability between the body 100 and the external electrodes 710 and 720 may be further improved.

Referring to FIGS. 7 and 8, distances D' from the upper surface of the first and second lead-out portions 410 and 420 to the lower surface of the first and second lead-out portions 410 and 420 increases toward the fourth and third surfaces 104 and 103 of the body 100, respectively. In this modified example, the area of the lead-out portion connected to the outermost turn may be secured in the entire component through the curved shape of the lead-out portion, and thus, the connection reliability between the body 100 and the external electrodes 710 and 720 may be further improved.

Third Modified Example of First Embodiment

Figure 9:
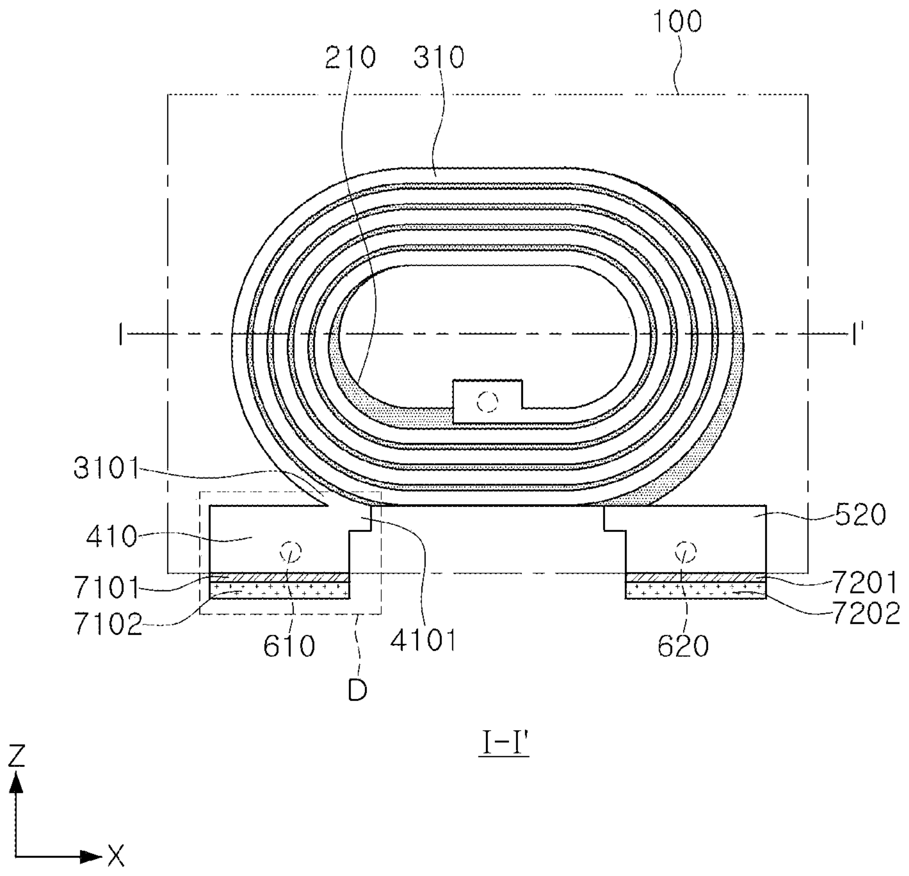
FIG. 9 is a diagram illustrating a third modified example of the first embodiment, and a view corresponding to FIG. 3.
Figure 10:
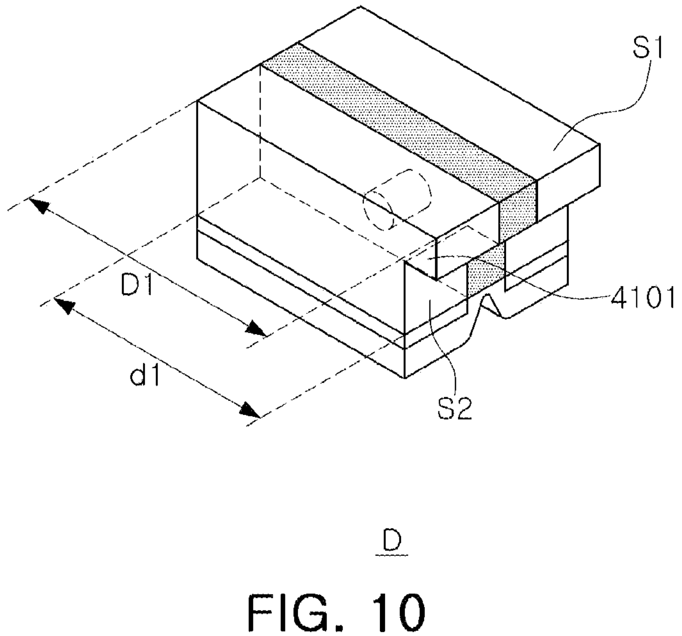
FIG. 10 is an enlarged view of portion D of FIG. 9.

FIG. 9 is a view illustrating a third modified example of the first embodiment, and is a view corresponding to FIG. 3. FIG. 10 is an enlarged view of portion D in FIG. 9.

A coil component 1000 according to the present modified example has a different shape of the lead-out portion compared to the coil component 1000 according to the first embodiment. Therefore, in describing the present modified example, only the shape of the lead-out portion different from that of the first embodiment will be described. For the rest of the configuration of this modification, the description in the first embodiment may be applied as it is.

Referring to FIG. 9, the first and second lead-out portions 410 and 420 include an anchor portion 4101 connected to the end 3101 of the outermost turn of the first coil portion and protruding toward the inside of the body 100, and an anchor portion connected to the end of the outermost turn of the second coil portion 320 and protruding toward the inside of the body 100. That is, outer side surfaces of the first and second lead-out portions 410 and 420 in the X direction are substantially flat without having a protruding portion. In this modified example, an area occupied by the body in the entire component may be significantly secured, and in a case in which external force acts on the first and second lead-out portions 410 and 420, the reliability of the connection between the first and second lead-out portions 410 and 420 and the body 100 may be improved.

Second Embodiment

Figure 11:
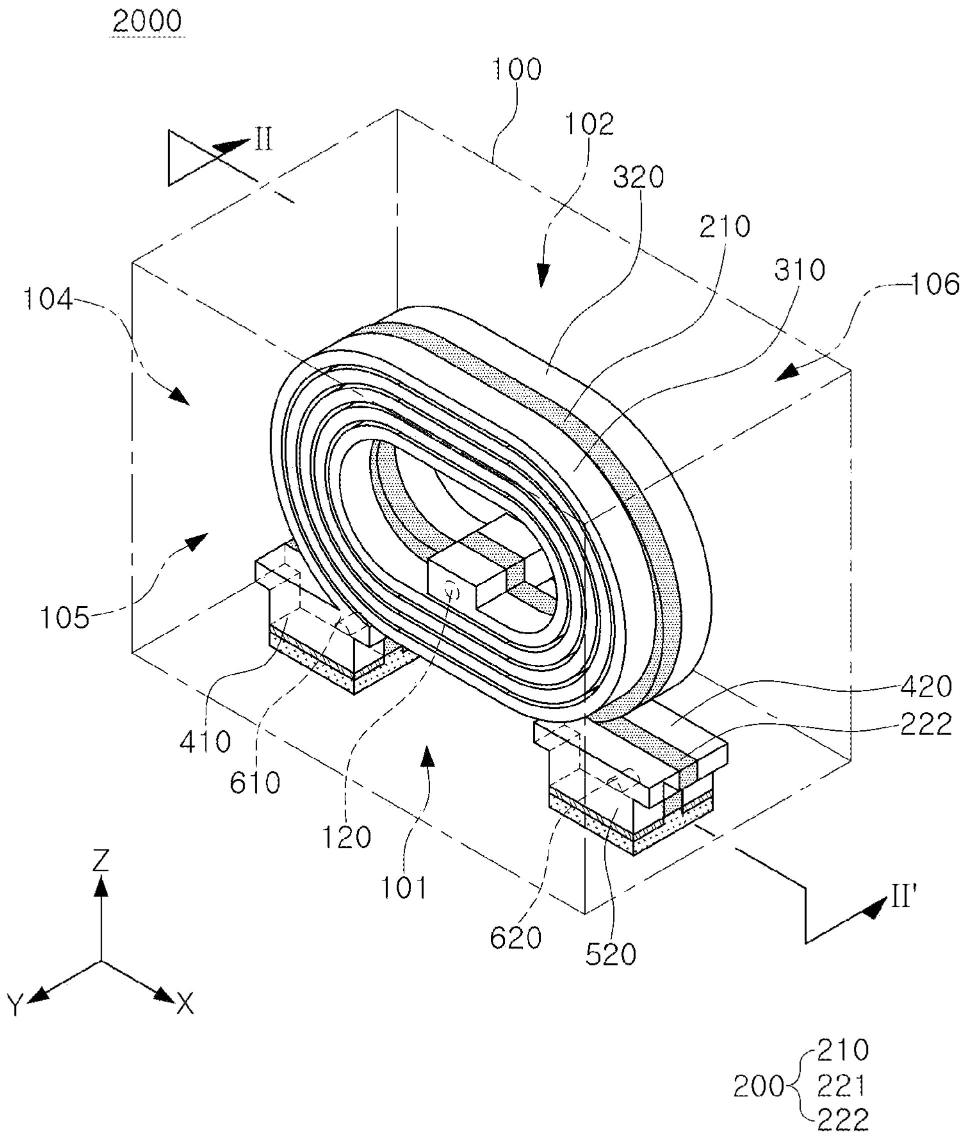
FIG. 11 is a schematic view illustrating a coil component according to a second embodiment.

FIG. 11 is a view schematically illustrating a coil component according to a second embodiment.

Figure 12:
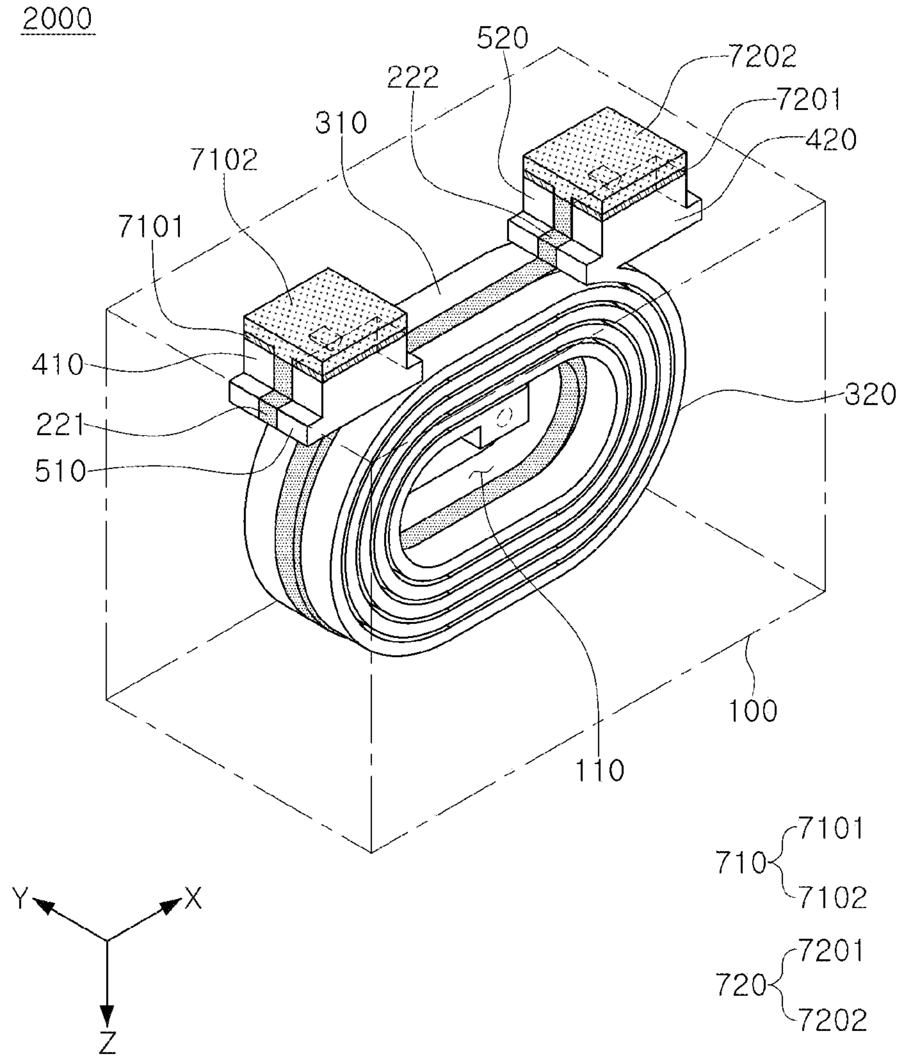
FIG. 12 is a view of the coil component of FIG. 11 as viewed from below.
Figure 13:
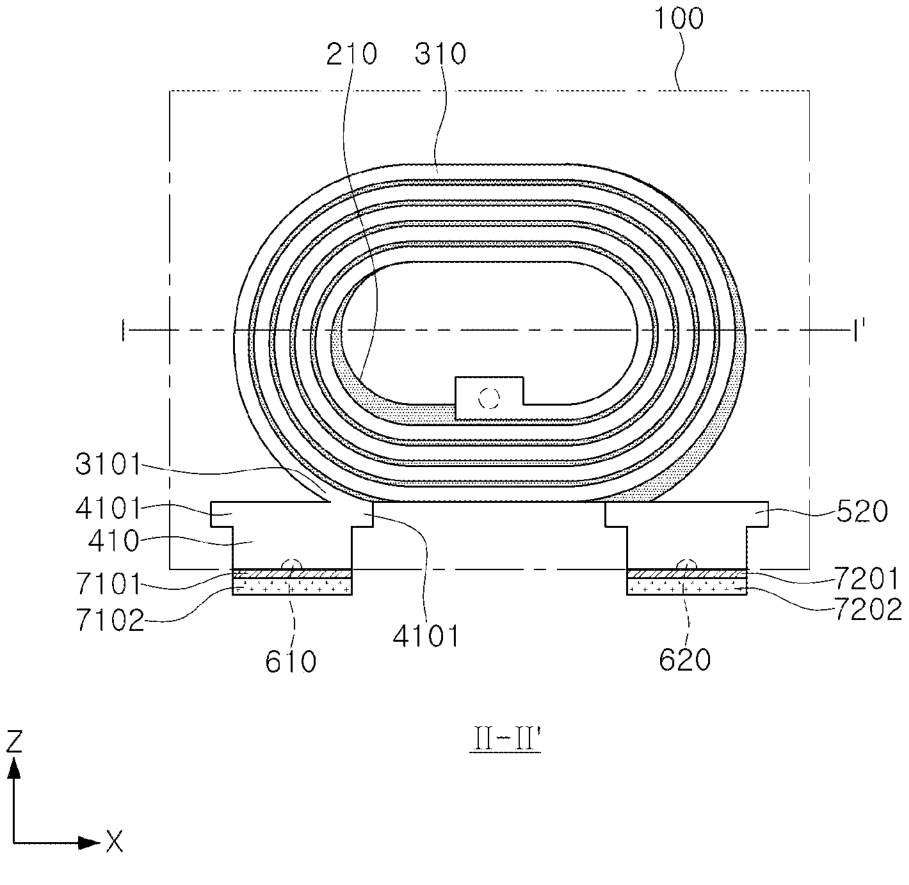
FIG. 13 is a cross-sectional view taken along line II-II' of FIG. 11.

FIG. 12 is a view of the coil component of FIG. 11 viewed from below. FIG. 13 is a cross-sectional view taken along line II-II' of FIG. 11.

In the case of a coil component 2000 according to the present embodiment, the shapes of first and second connection vias 610 and 620 and first and second external electrodes 710 and 720 are different from those of the coil component 1000 according to the first embodiment. Therefore, in describing the present embodiment, only the shapes of the first and second connection vias 610 and 620 and the shapes of the first and second external electrodes 710 and 720 different from those of the first embodiment will be described. For the rest of the configuration of the present embodiment, the description in the first embodiment may be applied as it is.

Referring to FIGS. 11 and 12, the first connection via 610 is disposed on a first end portion 221, and the second connection via 620 is disposed on a second end portion 222, so that the first and second connection vias 610 and 620 are exposed to be spaced apart from each other on the first surface 101 of the body 100. Specifically, referring to FIG. 11, the first connection via 610 penetrates through the first lead-out portion 410 and the first auxiliary lead-out portion 510 to be disposed in an area of the first end portion 221 exposed to the first surface 101 of the body 100, and the second connection via 620 respectively penetrates through the second lead-out portion 420 and the second auxiliary lead-out portion 520 to be disposed in an area of the second end portion 222 exposed to the first surface 101 of the body 100. As a result, the cross sections of the first and second connection vias 610 and 620 disposed on the first and second end portions 221 and 222, in the width direction Y of the body 100, has a shape in which a circle is partially removed.

Referring to FIGS. 11 and 12, the coil component 2000 according to the embodiment further includes a first external electrode 710 covering the first lead-out portion 410 and the first connection via 610, and a second external electrode 720 respectively covering the second lead-out portion 420 and the second connection via 620. On the other hand, referring to FIGS. 11 and 12, in first layers 7101 and 7201 covering the first and second end portions 221 and 222 in which the first and second connection vias 610 and 620 are not disposed, a spaced portion may be generated as in the first embodiment. However, plating may be performed in the spaced portion to fill the first layers 7101 and 7201 by adjusting the plating speed, the intensity of the current applied during plating, and the plating concentration. For example, since the first and second connection vias 610 and 620 exposed to the outer surface of the body 100 include a conductive material, the plating of the first layers 7101 and 7201 on the first and second end portions 221 and 222 may be facilitated.

On the other hand, the second layers 7102 and 7202 are disposed on the first layers 7101 and 7201 to cover the first layers 7101 and 7201 and the first and second end portions 221 and 222. For example, referring to FIG. 10, unlike in the first embodiment, the second layers 7102 and 7202 may not include concave portions. In this embodiment, the area in which the first layers 7101 and 7201 are disposed increases by as much as the area in which the first and second connection vias 610 and 620 are exposed to the outer surface of the body 100, and as a result, the surface area in which the external electrodes 710 and 720 are disposed may be further increased.

As set forth above, according to an exemplary embodiment, high capacity may be implemented by increasing the area occupied by a coil portion, while maintaining the size of the coil component.

In addition, according to an exemplary embodiment, connection reliability and structural rigidity of a portion in which a coil potion and an external electrode are connected may be enhanced.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A coil component comprising:

a body having a first surface and a second surface opposing each other;

a support substrate disposed in an interior of the body;

a coil portion disposed on at least one surface of the support substrate and including an outermost turn having an end disposed closer to the first surface of the body than the second surface of the body; and a lead-out portion having a first surface connected to the end of the outermost turn and a second surface opposing the first surface of the lead-out portion and exposed to the first surface of the body, the first and second surfaces of the lead-out portion being substantially parallel to each other, wherein an area of the first surface of the lead-out portion is greater than an area of the second surface of the lead-out portion.

2. The coil component of claim 1, wherein the lead-out portion comprises an anchor portion connected to the end of the outermost turn and disposed in the body.

3. The coil component of claim 1, wherein the body further has two side surfaces connecting the first surface to the second surface of the body and opposing each other in a length direction of the body, and the lead-out portion further comprises an anchor portion connected to the first surface of the lead-out portion and having portions protruding toward the two side surfaces of the body.

4. The coil component of claim 1, wherein the first surface of the lead-out portion has a curved shape.

5. The coil component of claim 1, wherein the lead-out portion further comprises an anchor portion connected to the first surface of the lead-out portion and having a portion protruding toward the second surface of the body.

6. The coil component of claim 1, wherein the lead-out portion further has a first side surface and a second side surface connecting the first surface to the second surface of the lead-out portion and opposing each other, and a distance from the first surface of the lead-out portion to the second surface of the lead-out portion increases toward a side surface of the body.

7. The coil component of claim 1, wherein the coil portion comprises a first coil portion disposed on a first surface of the support substrate, and a second coil portion disposed on a second surface of the support substrate to face the first coil portion, and the lead-out portion comprises a first lead-out portion disposed on the first surface of the support substrate and connected to an end of an outermost turn of the first coil portion, and a second lead-out portion disposed on the second surface of the support substrate and connected to an end of an outermost turn of the second coil portion.

8. The coil component of claim 7, wherein the support substrate comprises a support portion supporting the first and second coil portions, and first and second end portions supporting the first and second lead-out portions, respectively, wherein the first and second end portions are exposed to the first surface of the body and spaced apart from each other.

9. The coil component of claim 8, further comprising a first auxiliary lead-out portion disposed on the second surface of the support substrate, and opposing the first lead-out portion with respect to the first end portion, and a second auxiliary lead-out portion disposed on the first surface of the support substrate, and opposing the second lead-out portion with respect to the second end portion.

10. The coil component of claim 9, further comprising:

a first connection via penetrating through the first end portion and connecting the first lead-out portion to the first auxiliary lead-out portion, and a second connection via penetrating through the second end portion and connecting the second lead-out portion to the second auxiliary lead-out portion.

11. The coil component of claim 9, wherein the first and second auxiliary lead-out portions are exposed to the first surface of the body and spaced apart from each other.

12. The coil component of claim 10, further comprising first and second external electrodes covering the first and second lead-out portions, respectively.

13. The coil component of claim 12, wherein the first and second connection vias are exposed to the first surface of the body, and the first and second external electrodes cover the first and second connection vias, respectively.

14. The coil component of claim 12, wherein each of the first and second external electrodes includes a nickel plating layer and a tin plating layer disposed on the nickel layer.

15. The coil component of claim 14, wherein the nickel layer is not disposed on the first and second end portions of the support substrate, and the tin plating layer is directly disposed on the first and second end portions of the support substrate.

16. The coil component of claim 15, wherein the tin plating layer includes a concave portion formed in a central portion thereof.

17. The coil component of claim 10, wherein the first and second connection vias are spaced apart from the first surface of the body.

18. A coil component comprising:

a body having a first surface and a second surface opposing each other;

a support substrate disposed in an interior of the body, and including a first surface perpendicular to the first surface of the body;

a first coil portion disposed on the first surface of the support substrate and including an outermost turn having an end disposed closer to the first surface of the body than the second surface of the body; and a first lead-out portion having a first surface connected to the end of the outermost turn of the first coil portion, and a second surface opposing the first surface and exposed to the first surface of the body, the first and second surfaces of the first lead-out portion being substantially parallel to each other, wherein a line width of the first surface of the first lead-out portion is greater than a line width of the second surface of the first lead-out portion.

19. The coil component of claim 18, further comprising:

a second coil portion disposed on a second surface of the support substrate opposing the first surface of the support substrate, and including an outermost turn having an end disposed closer to the first surface of the body than the second surface of the body; and a second lead-out portion having a first surface connected to the end of the outermost turn of the second coil portion, and a second surface opposing the first surface and exposed to the first surface of the body, wherein a line width of the first surface of the second lead-out portion is greater than a line width of the second surface of the second lead-out portion.

20. The coil component of claim 18, wherein the first lead-out portion is spaced apart from two opposing side surfaces of the body in a length direction perpendicular to a thickness direction in which the first and second surfaces of the body oppose each other and a width direction in which the first coil is disposed on the support substrate.

21. A coil component comprising:

a body including first and second surfaces opposing each other and third and fourth surfaces connecting the first surface to the second surface of the body and opposing each other in a length direction of the body;

a support substrate disposed in an interior of the body;

a coil portion disposed on at least one surface of the support substrate and including an outermost turn having an end disposed closer to the first surface of the body than the second surface of the body; and a lead-out portion extending from the end of the outermost turn to the first surface of the body, and including a first surface connected to the end of the outermost turn and a second surface opposing the first surface of the lead-out portion and exposed to the first surface of the body, the first and second surfaces of the lead-out portion being substantially parallel to each other, wherein the lead-out portion includes at least one protruding portion extending toward the third surface or the fourth surface of the body in the length direction, and the at least one protruding portion shares a surface with the first surface of the lead-out portion.

22. The coil component of claim 21, wherein the at least one protruding portion includes two protruding portions extending toward both of the third and fourth surfaces of the body, respectively.

23. The coil component of claim 21, wherein the lead-out portion includes two side surfaces opposing each other and facing the third and fourth surfaces of the body, respectively, and one of the two side surfaces of the lead-out portion is substantially flat without having a protruding portion.

24. The coil component of claim 21, wherein an angle between the first surface of the lead-out portion and an outer circumferential surface of the outermost turn of the coil portion ranges between 0 degrees and 90 degrees.

25. The coil component of claim 24, wherein the first surface of the lead-out portion has a curved shape.

26. A coil component comprising:

a body having a first surface and a second surface opposing each other;

a support substrate disposed in an interior of the body;

a coil portion disposed on at least one surface of the support substrate and including an outermost turn having an end disposed closer to the first surface of the body than the second surface of the body; and a lead-out portion having a first surface connected to the end of the outermost turn and a second surface opposing the first surface of the lead-out portion and exposed to the first surface of the body, the first and second surfaces of the lead-out portion being substantially parallel to each other, wherein the lead-out portion includes a tapered portion in a direction from the first surface of the lead-out portion to the second surface of the lead-out portion.

27. The coil component of claim 26, wherein the lead-out portion comprises an anchor portion connected to the end of the outermost turn and disposed in the body.

28. The coil component of claim 26, wherein the body further has two side surfaces connecting the first surface to the second surface of the body and opposing each other in a length direction of the body, and the lead-out portion further comprises an anchor portion connected to the first surface of the lead-out portion and having portions protruding toward the two side surfaces of the body.

29. The coil component of claim 26, wherein the first surface of the lead-out portion has a curved shape.

30. The coil component of claim 26, wherein the lead-out portion further comprises an anchor portion connected to the first surface of the lead-out portion and having a portion protruding toward the second surface of the body.

* * * * *